ated Jan. 16, 1973

3,711,488
PROCESS FOR PREPARING N-ARYL PYRID-2-ONES
Horst O. Bayer, Levittown, and Patrick J. Nulty, Wyndmoor, Pa., assignors to Rohm and Haas Company, Philadelphia, Pa.
No Drawing. Filed June 9, 1970, Ser. No. 44,862
Int. Cl. C07d 31/36
U.S. Cl. 260—295.5 R      6 Claims

ABSTRACT OF THE DISCLOSURE

Novel compounds belonging to the class of 1-aryl-3-carboxy-4-methylpyrid-2-ones and a novel method for preparing them. These compounds possess biological activity and in particular are plant growth regulators.

---

This invention is concerned with new members of the class of N-aryl pyrid-2-ones and a novel method for preparing them.

The compounds of this invention may be represented by the general formula

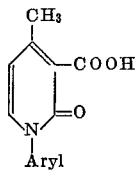

(I)

wherein
Aryl is selected from the group consisting of

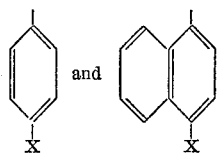

wherein X is selected from the group consisting of amino, fluoro, chloro, bromo, iodo, alkyl of 1 to 5 carbon atoms, trifluoromethyl, methoxy and nitro, and salts thereof.

The most closely related compounds in the literature are 1-aryl-3-carboxy-4,6-dialkylpyrid-2-ones and 1-aryl-3-carboxy-4,5,6-trialkylpyrid-2-ones which are the subject of Belgian Pat. 726,971. The method of preparation used for these compounds was hydrolysis of the corresponding 3-cyanopyrid-2-ones, i.e.

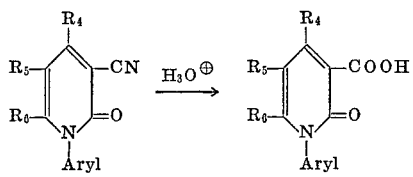

Typical compounds within the scope of this invention include:

1-(4-aminophenyl)-3-carboxy-4-methylpyrid-2-one
1-(4-fluorophenyl)-3-carboxy-4-methylpyrid-2-one
1-(4-chlorophenyl)-3-carboxy-4-methylpyrid-2-one
1-(4-bromophenyl)-3-carboxy-4-methylpyrid-2-one
1-(4-iodophenyl)-3-carboxy-4-methylpyrid-2-one
1-(4-methylphenyl)-3-carboxy-4-methylpyrid-2-one
1-(4-methoxyphenyl)-3-carboxy-4-methylpyrid-2-one
1-(4-nitrophenyl)-3-carboxy-6-methylpyrid-2-one
1-(4-trifluoromethylphenyl)-3-carboxy-4-methylpyrid-2-one
1-(4-bromonaphthyl)-3-carboxy-4-methylpyrid-2-one
1-(4-fluoronaphthyl)-3-carboxy-4-methylpyrid-2-one
1-(4-methylnaphthyl)-3-carboxy-4-methylpyrid-2-one
1-(4-trifluoromethylnaphthyl)-3-carboxy-4-methylpyrid-2-one
1-(4-methoxynaphthyl)-3-carboxyl-4-methylpyrid-2-one
1-(4-nitronaphthyl)-3-carboxy-4-methylpyrid-2-one and salts of the above.

Based on plant growth regulatory activity, preferred compounds of this invention include 1-(4-chlorophenyl)-3-carboxy-4-methylpyrid-2-one and its water-soluble salts. Water soluble salts of the compounds of Formula I include the alkali metal salts, preferably the sodium and potassium derivatives; the ammonium; mono, di and trialkylammonium wherein each alkyl group may contain up to 4 carbon atoms, preferably methylammonium, dimethylammonium, trimethylammonium and triethylammonium; ethanolamine and propanolamine salts such as the 2 - hydroxyethylammonium, 2-hydroxypropylammonium, bis(2-hydroxyethyl)ammonium and tris(2-hydroxyethyl)- and quaternary ammonium salts such as tetramethylammonium and choline. Other useful salts include the alkaline earth salts, particularly the calcium and magnesium, aluminum, cadmium, copper, ferric, ferrous, manganese, nickel and zinc.

The novel method for preparing the compounds of Formula I consists in the following sequence of reactions:

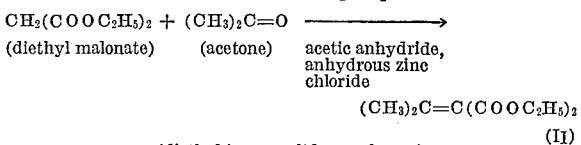

(II)

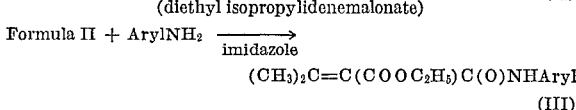

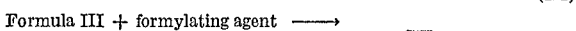

(III)

Formula III + formylating agent   ⟶

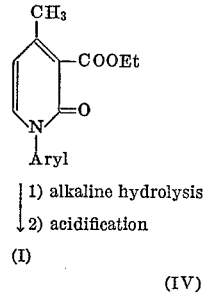

|1) alkaline hydrolysis
↓2) acidification (I)

(IV)

In the above reaction aryl is as defined above.

The reaction of diethyl malonate with acetone follows the procedure of Cope and Hancock, J. Am. Chem. Soc., 60, 2645 (1939) for the preparation of diethyl isopropylidenemalonate, i.e. Formula II. The condensation is effected through the use of acetic anhydride and freshly-fused zinc chloride.

The reaction of a diethyl isopropylidenemalonate with an aniline is effected by heating in the range of 100–250° C. in the presence of a catalytic amount of imidazole. The two reactants in equimolar amount may be used; however, an excess of the diethyl isopropylidenemalonate up to 5 mole equivalents is preferred. The crude acetanilide of Formula III may be used in the following ring-closure step without isolation; however, it is usually preferred to purify the acetanilide before the subsequent ring-closure reaction.

The anilides of Formula III are subjected to ring-closure by means of strong formylating agents. Suitable formylating agents include trialkyl orthoformates, i.e. $(RO)_3CH$ such as trimethyl orthoformate; N,N-dimethylformamide dialkyl acetals, i.e. $(RO)_2CHN(CH_3)_2$ such as $(CH_3O)_2CHN(CH_3)_2$; and dialkoxy-methyl acetates, i.e.

$CH_3C(O)OCH(OR)_2$ such as $CH_3C(O)OCH(OCH_3)_2$, for which see J. W. Scheeren and W. Stevens, Rec. trav. Chim., 85, 793 (1966), wherein R is a lower alkyl group. The ring-closure reaction is often run without the use of a solvent other than an excess of the formylating agent and in the temperature range of 25 to 200° C.

The following examples are illustrative of preparations of the compounds of the invention, but are not to be construed as limitations thereof.

EXAMPLE 1

Preparation of 1-(4-chlorophenyl)-3-carboxy-4-methylpyrid-2-one (a) Preparation of 4'-chloro-2-carbethoxy-2-isopropylideneacetanilide,

$(CH_3)_2C=C(COOC_2H_5)C(O)NHC_6H_4Cl-4$

A reaction mixture consisting of diethyl isopropylidenemalonate (50 g., 0.25 mole, B.P. 114–118° C.), p-chloroaniline (8 g., 0.063 mole) and imidazole (1 g.) was heated at 200° C. under an atmosphere of nitrogen for 3 hours. The mixture was cooled and there was isolated 7.2 g. of crystals. The solid was recrystallized from ligroin (300 ml.) to give 4.7 g. of light yellow crystals melting at 96–101° C. and 1 g. of crystals melting at 103–107° C. The main product was found by analysis to contain 59.8% C, 5.7% H, 12.7% Cl, 5.4% N and 16.9% O; calculated for $C_{14}H_{16}ClNO_3$ is 59.7% C, 5.7% H, 12.6% Cl, 5.0% N and 17.0% O. The product is a 33% yield of 4'-chloro-2-carbethoxy-2-isopropylideneacetanilide.

(b) Preparation of 1-(4-chlorophenyl)-3-carbethoxy-4-methylpyrid-2-one.—A reaction mixture consisting of 4'-chloro-2-carbethoxy-2-isopropylideneacetanilide (9.3 g., 0.033 mole) and N,N-dimethylformamide dimethyl acetal (18 ml., 0.15 mole) was heated at 90° C. for 90 minutes. The reaction mixture was cooled to room temperature and filtered. The filtrate was stripped in vacuo, then dissolved in a 3% solution of acetone in toluene and chromatographed on a silicic acid column. The product-containing fractions were evaporated to give a solid. The solid was recrystallized from ether to give 3.4 g. of white crystals melting at 114–116.5° C. This solid was found to contain by analysis 61.6% C, 4.7% H, 12.1% Cl, 4.8% N and 16.8% O; calculated for $C_{15}H_{14}ClNO_3$ is 61.8% C, 4.8% H, 12.2% Cl, 4.8% N and 16.5% O. The product is a 36% yield of 1-(4-chlorophenyl)-3-carbethoxy-4-methylpyrid-2-one.

(c) Hydrolysis of 1-(4-chlorophenyl)-3-carbethoxy-4-methylpyrid-2-one.—A mixture of 1-(4-chlorophenyl)-3-carbethoxy-4-methylpyrid-2-one (8.2 g., 0.029 mole) and 15% sodium hydroxide (300 ml.) was heated on a steam bath at 90° C. for 3 hours. The solution was cooled to room temperature, acidified with hydrochloric acid, filtered, washed with water and dried to give 6.8 g. of white solid melting at 253–255° C. The product was found to contain by analysis 56.4% C, 3.7% H, 14.4% Cl, 4.9% N and 20.3% O; calculated for $C_{13}H_{10}ClNO_3$ is 59.2% C, 3.8% H, 13.5% Cl, 5.3% N and 18.2% O. The solid is a 92% weight yield of 1-(4-chlorophenyl)-3-carboxy-4-methylpyrid-2-one.

EXAMPLE 2

Preparation of 1-(4-bromophenyl)-3-carboxy-4-methylpyrid-2-one

When an equimolar amount of p-bromoaniline was substituted for the p-chloroaniline in Example 1(a) above, there was obtained 4'-bromo-2-carbethoxy-2-isopropylideneacetanilide melting at 119–121° C. The product was found by analysis to contain 51.1% C, 4.7% H, 26.1% Br, 4.7% N and 14.3% O; calculated for $C_{14}H_{16}BrNO_3$ is 51.5% C, 4.9% H, 24.5% Br, 4.3% N and 14.7% O.

4'-bromo-2-carbethoxy-2-isopropylideneacetanilide was allowed to react with N,N-dimethylformamide dimethyl acetal by the method of Example 1(b) to give 1-(4-bromophenyl)-3-carbethoxy-4-methylpyrid-2-one as a solid melting at 121–122° C. This was found to contain by analysis 53.8% C, 4.2% H, 23.9% Br, 4.1% N and 14.7% O; calculated for $C_{15}H_{14}BrNO_3$ is 53.6% C, 4.2% H, 23.8% Br, 4.2% N and 14.3% O.

1-(4-bromophenyl)-3-carbethoxy-4-methylpyrid-2-one was hydrolyzed by the method of Example 1(c) to give 1-(4-bromophenyl)-3-carboxy-4-methylpyrid-2-one as a solid melting at 245–246° C. The product was found by analysis to contain 50.4% C, 3.4% H, 25.7% Br, 4.4% N and 15.8% O; calculated for $C_{13}H_{10}BrNO_3$ is 50.6% C, 3.3% H, 26.0% Br, 4.5% N and 15.6% O.

EXAMPLE 3

Preparation of 1-(4-methylphenyl)-3-carboxy-4-methylpyrid-2-one

When an equimolar amount of p-toluidine was substituted for the p-chloroaniline in Example 1(a) above, there was obtained 4'-methyl-2-carbethoxy-2-isopropylideneacetanilide melting at 102–103° C. The product was found by analysis to contain 68.6% C, 7.2% H, 5.4% N and 18.8% O; calculated for $C_{15}H_{19}NO_3$ is 68.9% C, 7.3% H, 5.4% N and 18.4% O.

4'-methyl-2-carbethoxy-2-isopropylideneacetanilide was allowed to react with N,N-dimethylformamide dimethyl acetal by the method of Example 1(b) to give 1-(4-methylphenyl-3-carbethoxy-4-methyl-pyrid-2-one as a solid melting at 104–106° C. This was found to contain by analysis 70.7% C, 6.4% H, 5.1% N and 18.2% O; calculated for $C_{16}H_{17}NO_3$ is 70.8% C, 6.3% H, 5.2% N and 17.7% O.

1-(4-methylphenyl)-3-carbethoxy-4-methylpyrid-2-one was hydrolyzed by the method of Example 1(c) to give 1-(4-methylphenyl)-3-carboxy-4-methylpyrid-2-one as a solid melting at 168–170° C. The product was found to contain by analysis 69.1% C, 5.3% H, 5.6% N and 19.5% O; calculated for $C_{14}H_{13}NO_3$ is 69.1% C, 5.4% H, 5.8% N and 19.8% O.

EXAMPLE 4

Preparation of 1-(4-chloronaphthyl)-3-carboxy-4-methylpyrid-2-one

When an equal molar amount of 1-amino-4-chloronaphthalene was substituted for the p-chloroaniline in Example 1(a) above, there was obtained 4'-chloro-2-carbethoxy-2-isopropylideneacet-α-naphthanilide melting at 158–160° C. The product was found to contain by analysis 65.5% C, 5.6% H, 11.0% Cl, 4.3% N and 13.9% O; calculated for $C_{18}H_{18}ClNO_3$ is 65.2% C, 5.5% H, 10.7% Cl, 4.2% and 14.5% O.

4'-chloro-2-carbethoxy-2-isopropylideneacet-α-naphthanilide was allowed to react with N,N-dimethylformamide dimethyl acetal by the method of Example 1(b) to give 1-(4-chloronaphthyl)-3-carbethoxy-4-methylpyrid-2-one as an amber oil. This was found by analysis to contain 65.3% C, 5.3% H, 11.2 Cl, 4.4% N, 12.7% O; calculated for $C_{19}H_{16}ClNO_3$ is 66.8% C, 4.7% H, 10.4% Cl, 4.1% N and 14.0% O.

1-(4-chloronaphthyl)-3-carbethoxy-4-methylpyrid-2-one was hydrolyzed by the method of Example 1(c) to give 1-(4-chloronaphthyl)-3-carboxy-4-methylpyrid-2-one as a solid melting at 237–240° C. This was found by analysis to contain 65.3% C, 4.0% H, 11.0% Cl, 4.4% N and 15.0% O; calculated for $C_{17}H_{12}ClNO_3$ is 65.1% C, 3.9% H, 11.3% Cl, 4.5% N, and 15.3% O.

The compounds of this invention have been found to produce a variety of plant responses. These responses are observed when the compounds alone or in a carrier or as formulations are applied to the plant itself, as by foliar application, or to plant parts such as by seed treatment or to the environment or habitat of the plant, such as by soil drenching or soil incorporation. The most outstanding plant-growth influencing property is suppression of growth.

This is most commonly found to be a growth inhibitory action on the stem, i.e., stem elongation is inhibited. In other instances flowering or seed formation is altered. In other cases modification of leaves is noted. Sometimes, particularly at high dosages, a plant species may be herbicidally sensitive.

One type of test was used which was designed to give a preliminary evaluation of plant growth response to the chemicals. In this test, seeds of typical monocotyledonous and dicotyledonous plants were planted in individual 4 inch pots and two weeks thereafter the pots were drenched with an aqueous suspension of the test chemical at a rate of 10 pounds per acre. Two weeks and 4 weeks thereafter the plants were visually observed for percent inhibition as compared to untreated controls and for injury (on a 0=no effect to 10=complete kill scale) or other growth response. Table I gives the results.

For foliage spray tests, the compounds were dissolved in an appropriate solvent, usually acetone for the acids and water for the water-soluble salts and sprayed onto the foliage at a given dosage per acre in a carrier volume of about 50 gallons per acre. Growth responses were subsequently observed. In one such test the compounds were evaluated using eleven-day old potted wheat plants.

Solutions of the test compounds were sprayed onto the potted plants, using a calibrated sprayer at such a rate as to deliver 2 and 4 lbs. per acre. The solutions were appropriately diluted for lower rates. Two weeks after treatment the percent inhibition as compared to control plants was measured. Table III gives the results:

TABLE I

[Plant growth regulation at 10 lb./a.]

| Example Number | Plant | After 2 weeks | | After 4 weeks | |
|---|---|---|---|---|---|
| | | Percent inhibition | Injury | Percent inhibition | Injury |
| 1 | Sorghum a | No effect | 0 | No effect | 0. |
| | Wheat b | 60 | 0 | 30 | 0. |
| | Beans c | 30 | 3 (abnormal flowers, spinach-leaf effect g) | 30 | 5 (chlorotic leaves, delayed fruit set). |
| | Cotton d | 20 | | No effect | |
| 2 | Sorghum | 30 | 0 | 30 | 3. |
| | Turf grass e | 20 | 2 | 100 | 10. |
| | Beans | 50 | 3 (spinach-leaf effect) | 60 | 7 (spinach-leaf effect, delayed fruit set). |
| | Tomatoes f | 50 | 4 | 50 | 5. |
| 3 | Sorghum | 10 | 0 | 0 | 0. |
| | Turf grass | 0 | 2 | 0 | 0. |
| | Beans | 0 | 0 (spinach-leaf effect) | 30 | 5 (spinach-leaf effect, delayed fruit set). |
| | Tomatoes | 60 | 4 | 0 | 0. |
| 4 | Sorghum | 50 | 2 | 50 | 2. |
| | Turf grass | 60 | 2 | 40 | 2. |
| | Beans | 30 | 0 | 40 | 0 (delayed fruit set). |
| | Tomatoes | 70 | 5 | 80 | 8. | a *Sorghum vulgare.*
b *Triticum vulgare.*
c *Phaseolus vulgaris.*
d *Gossypium herbaceum.*
e A mixture of fesque (*Festuca* spp.) and annual rye (*Lolium multiflorum*).
f *Lycopersicum esculentum.*
g Wrinkled leaves.

A soil drench test was used as one method for evaluating the plant growth regulating properties of the compounds of this invention. In this test, seeds or plants were planted in pots and at a given stage of growth the soil was watered with a preparation containing the compound at given dosages in terms of pound per acre. Growth responses were subsequently observed.

In one such test about 20 wheat seeds were planted in a 4 inch pot and allowed to grow for 11 days, at which time the second leaf of wheat was emerging. A solution or suspension of the chemical was prepared by dissolving the compound in about 1 ml. of acetone or water and adding sufficient water to make 50 ml. The amount of chemical was such as to provide 2 and 4 pounds per acre. For example 2 mg. give 2 lbs./a. or 2.2 kilos per hectare. Each test was run in triplicate and untreated plants were included as controls. Two weeks after treatment the overall height of the plants from the soil level to the leaf tip was measured and the percent inhibition calculated. The formula used for the calculation was Percent inhibition = $100 - \left(100 \times \frac{\text{height of treated plant}}{\text{height of control plant}}\right)$ Table II gives the results.

TABLE II

[Inhibition of wheat plants by soil drench]

| Example | Percent inhibition at— | |
|---|---|---|
| | 2 lbs./a. | 4 lbs./a. |
| 1 | 30 | 40 |
| 2 | 34 | 31 |
| 3 | 13 | 20 |
| 4 | 26 | 37 |

TABLE III

[Inhibition of wheat plants by foliar application]

| Example | Percent inhibition at— | |
|---|---|---|
| | 2 lbs./a. | 4 lbs./a. |
| 1 | 17 | 26 |
| 2 | 22 | 28 |
| 3 | 2 | 3 |
| 4 | 15 | 16 |

In seed treatment tests an aqueous solution or suspension of the test compound was prepared and diluted to various percent concentrations. Seeds were then immersed in these preparations for about 20 hours, after which they were washed with water, planted in untreated soil, and the germination and growth subsequently observed.

In one such greenhouse test the free acids of Examples 1, 2, 3 and 4 were neutralized with an equimolar amount of sodium hydroxide and dissolved in water to give a series of concentrations varying from 0.03% to 3%. Seeds of barley, oats and wheat were treated with these solutions as indicated above and planted. Three weeks after planting observations were made as to the number of germinated plants which had emerged and the height of these plants as compared to untreated controls. The percent inhibition was determined as the average of the percent inhibition in height of the germinated plant as compared to untreated controls and the percent inhibition in seed germination. A 100% inhibition indicates that the seeds did not germinate or that no plants appeared. A plus (+) value indicates that the plant growth was taller and/or more seeds germinated than for untreated controls. Table IV gives the results:

TABLE IV

[Inhibition of cereals by seed treatment]

| Example | Plant specie | Percent inhibition at— | | | | |
|---|---|---|---|---|---|---|
| | | 0.03% | 0.1% | 0.3% | 1% | 3% |
| 1 | Barley | + | 52 | 100 | 59 | 88 |
| | Oats | 2 | 6 | 9 | 38 | 51 |
| | Wheat | 6 | 15 | 29 | 64 | 65 |
| 2 | Barley | 2 | 25 | 62 | 100 | 100 |
| | Oats | 8 | 11 | 19 | 42 | 55 |
| | Wheat | + | 25 | 53 | 61 | 67 |
| 3 | Barley | 7 | 70 | + | 37 | 65 |
| | Oats | + | 0 | 2 | 9 | 23 |
| | Wheat | + | 1 | 13 | 25 | 44 |
| 4 | Barley | 70 | 100 | 100 | 100 | 100 |
| | Oats | 36 | 68 | 61 | 90 | 100 |
| | Wheat | 36 | 58 | 73 | 94 | 100 |

When the compounds of this invention are applied to plants or to the habitat of plants, they give a growth regulating response in the dosage range of about 0.01 to 30 pounds per acre (0.011 to 33 kilos per hectare). At the higher dosages, herbicidal responses may be manifested. Depending on the type of response desired, the amount will vary with the plant species to be treated. Generally the preferred range is from 0.05 to 15 pounds per acre. Seeds may be treated with the compounds themselves or with any concentration of a solution or formulation of them.

The compounds of this invention may be employed as plant growth response agents either individually or as a mixture of two or more of them. They also may be used in combination with other plant growth regulatory compounds such as maleic hydrazide, succinic acid, 2,2-dimethylhydrazide, choline and its salts, (2-chloroethyl) trimethylammonium chloride, triiodobenzoic acid, tributyl - 2,4 - dichlorobenzylphosphonium chloride, polymeric N-vinyl-2-oxazolidinones, tri(dimethylaminoethyl) phosphate and its salts, and N-dimethylamino-1,2,3,6-tetrahydrophthalamic acid and its salts. The compounds of this invention may also be combined with a herbicide for use on plants which are not sensitive to the herbicide at weed controlling rates. For example, they may be combined with 2,4-D for use on monocotyledonous plants such as cereals and turf grasses, with 3',4'-dichloropropionanilide for use on rice or with 2,4-dichlorophenyl 4-nitrophenyl ether for use on rice and other cereals.

The compounds of this invention may be applied in liquid carriers. One preferred group of the compounds is the water soluble salts, in which case water is the preferred carrier. Nonphytotoxic organic solvents such as ketones, alcohols, glycols, dimethylformamide and dimethyl sulfoxide may be employed. If desired a surfactant such as a wetting agent may also be used and this usually constitutes a minor part (in general less than 10%) of the solution or formulation. The surface active agents may be anionic, cationic or non-ionic. For the water-soluble salts cationic and non-ionic surfactants are preferred. Commonly used surfactants are well-known in the art and may be found in John W. McCutcheon's publication "Detergents and Emulsifiers, 1969 Annual," John W. McCutcheon Inc., Morristown, N.J.

The compounds of this invention may be formulated in various ways as for example emulsifiable concentrates, wettable powders, dusts, granules and pellets. Usually for application to the plant or plant parts or the plant habitat, the formulations are extended with a suitable carrier. Emulsifiable concentrates are most usually extended with a liquid carrier such as water and dusts, granules and pellets are most usually extended with a solid carrier such as mineral clays.

Emulsifiable concentrates may be made by dissolving the compounds in an organic solvent and adding one or more solvent-soluble emulsifying agents. Suitable solvents are usually water-immiscible and may be found in the hydrocarbon, chlorinated hydrocarbon, ketone, ester, alcohol and amide classes of organic solvents.

Wettable powders may be made by incorporating the compounds in an inert, finely divided solid carrier along with a surfactant which may be one or more emulsifying, wetting, dispersing or spreading agents or blends of these. Suitable carriers may be found in the classes of clays, silicates, silicas, limes, carbonates and organic carriers.

Solid compositions in the form of dusts may be made by compounding the compounds of this invention with inert carriers conventionally employed for the manufacture of pesticidal dusts for agricultural use, such as talcs, finely particled clays, pyrophyllite, diatomaceous earth, magnesium carbonate or wood or walnut shell flours.

Granular or pelletized formulations may be made by incorporating the compounds into granular or pelletized forms of agronomically acceptable carriers such as granular clays, vermiculite, charcoal, ground corn cobs or bran.

The compounds of this invention have exhibited pre- and/or postemergence herbicidal activity in standard greenhouse tests at 10 lbs./a.

The growth regulatory action of the compounds of the present invention may be advantageously employed in various ways. The production of shorter and thicker stems in cereal grains reduces the tendency toward lodging. Turf grasses may be maintained at a low height and the necessity for frequent mowing alleviated. The plant growth on embankments, such as roadsides, may be controlled to prevent erosion and at the same time maintain its aesthetic value. There may be an advantage in producing a dormant period in certain plants. The control of flowering and fruiting may be advantageous in the production of seedless fruit and for hybridization. Delaying the vegetation process or altering the time of flowering and fruiting may result in more advantageous harvest dates or increased flower, fruit and/or seed production. The chemical pruning of trees, shrubs, ornamentals and nursery stock may be beneficial. Other applications of the compounds of the present invention will suggest themselves to those skilled in the art of agriculture and horticulture.

We claim:
1. A method for preparing a compound of the formula

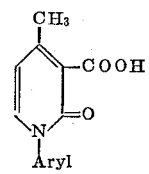

wherein aryl is selected from the group consisting of

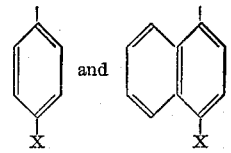

wherein X is amino, fluoro, chloro, bromo, iodo, alkyl of 1 to 5 carbon atoms, trifluoromethyl, methoxy and nitro, which comprises (a) reacting diethyl isopropylidenemalonate with an aromatic amine of the formula

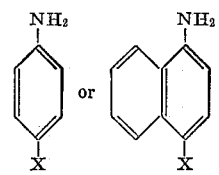

wherein X has the meaning given above to produce an anilide of the formula

wherein

Aryl is as defined above, (b) reacting an anilide of the formula

as produced in step (a) above with a formylating agent to produce an ester of the formula

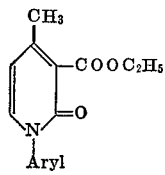

wherein aryl is as defined above, and (c) hydrolyzing the said ester of step (b) above to the free acid of the formula

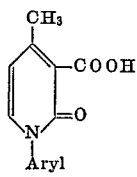

2. A method of preparation according to claim 1 wherein step (a) is run in the temperature range of 100° to 250° C.

3. A method according to claim 1 wherein step (a) is run in the presence of a catalytic amount of imidazole.

4. A method of preparation according to claim 1 wherein said aromatic amine of step (a) is p-chloroaniline.

5. A method according to claim 1 wherein the said formylating agent of step (b) is N,N-dimethylformamide dimethyl acetal.

6. A method according to claim 1 wherein the said formylating agent is dimethoxymethyl acetate.

References Cited

UNITED STATES PATENTS 3,503,986   3/1970   Seidel et al. _____ 260—295.5
3,576,814   4/1971   Seidel et al. _____ 260—295.5

ALAN L. ROTMAN, Primary Examiner

U.S. Cl. X.R.

71—94; 260—295.5 B

UNITED STATES PATENT OFFICE
CERTIFICATE OF CORRECTION

Patent No. 3,711,488                    Dated January 16, 1973

Inventor(s) Horst O. Bayer and Patrick J. McNulty

It is certified that error appears in the above-identified patent and that said Letters Patent are hereby corrected as shown below:

Inventors name "Nulty" should be changed to --McNulty--.

Signed and sealed this 3rd day of July 1973.

(SEAL)
Attest:

EDWARD M. FLETCHER, JR.                 Rene Tegtmeyer
Attesting Officer                       Acting Commissioner of Patents

UNITED STATES PATENT OFFICE
CERTIFICATE OF CORRECTION

Patent No. 3,711,488    Dated January 16, 1973

Inventor(s) Horst O. Bayer and Patrick J. McNulty

It is certified that error appears in the above-identified patent and that said Letters Patent are hereby corrected as shown below:

In the specification, make the following change:

Column 1, line 67, "-6-" to read -- -4- --

Signed and sealed this 30th day of April 1974.

(SEAL)
Attest:

EDWARD M.FLETCHER,JR.
Attesting Officer

C. MARSHALL DANN
Commissioner of Patents